(No Model.)
O. P. HOWARD.
STONE DRESSING TOOL.
No. 513,509. Patented Jan. 30, 1894.
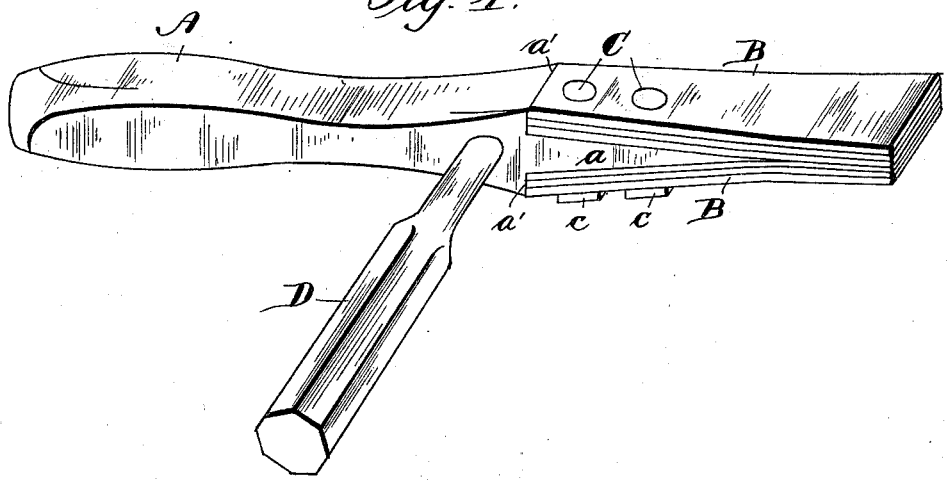
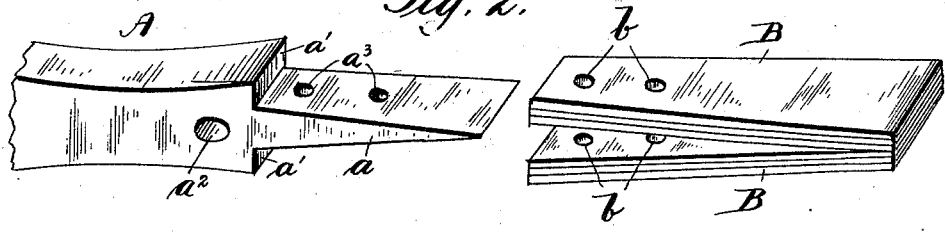
Witnesses:
Wm E. Coulter
H. W. Sadler.
Inventor:
Octave P. Howard,
by his attorney
H. B. Willson.

UNITED STATES PATENT OFFICE.

OCTAVE P. HOWARD, OF ROCKLAND, MAINE.

STONE-DRESSING TOOL.

SPECIFICATION forming part of Letters Patent No. 513,509, dated January 30, 1894.

Application filed April 22, 1893. Serial No. 471,491. (No model.)

*To all whom it may concern:*

Be it known that I, OCTAVE P. HOWARD, a citizen of the United States, residing at Rockland, in the county of Knox and State of Maine, have invented certain new and useful Improvements in Stone-Dressing Tools; and I do hereby declare the following to be a full, clear, and exact description of the invention, such as will enable others skilled in the art to which it appertains to make and use the same.

My invention has relation to stone-dressing tools, and more particularly to a combined bush-chisel and bush-hammer, and among the objects in view is to provide an extremely simple, inexpensive, and efficient combined bush-chisel and bush-hammer wherein the cuts will be firmly secured to the stock and prevented from accidental displacement while in use, and wherein the said cuts may be readily removed when broken or for other causes and others substituted, and with the above and certain other objects in view, the invention consists in the peculiar construction, arrangement and combination of parts, as will be hereinafter fully described, illustrated in the accompanying drawings, and pointed out in the appended claim.

In the drawings: Figure 1 is a perspective view of my combined bush-chisel and bush-hammer. Fig. 2 is a similar view of the parts detached.

A indicates a suitable stock or handle which is provided toward one end with the shoulders $a'$, and with a shank $a$, which is tapered toward its outer end, and at said end the shank is slightly wider than at its inner end where it joins the shoulders.

B indicate the cuts which are tapered as shown toward their inner ends at which point they are of a width corresponding to the width of the shoulders of the stock. The number of cuts that I may use with my device may vary, but I preferably employ such a number that when arranged on each side of the shank $a$, the outer edge of the outermost cuts will, at the inner ends of the same, lie flush with the outer edges of the shoulders, as seen in Fig. 1.

For securing the cuts firmly in position upon the shank $a$, I provide said cuts toward their inner ends with aligned openings $b$, which, when the cuts are arranged in proper position on each side of the shank, will register with openings $a^3$ provided in the shank, and through the aligned openings $b$, $a^3$, are passed bolts C, the heads whereon may, if desired be countersunk in the outermost cut, and upon the opposite ends of the bolts are screwed nuts $c$, $c$, by means of which the cuts may be very firmly and yet removably secured in place. I prefer to make the outermost cuts slightly thicker than the inner cuts, up to a point about opposite the outer end of the shank $a$, from which point to the outer ends of said outermost cuts, the latter are of a width corresponding to the inner cuts. Thus, the outermost cuts serve to prevent the inner cuts from spreading by acting as clamping jaws for the same.

As thus far described, my device may be used as a chisel in working upon stone, and for the purpose of adapting said device to be used as a hammer also, whenever this may be desired, I provide the stock with a transverse opening $a^2$ into which is inserted a suitable handle D. Should any of the cuts become broken in use, the nuts $c$, are unscrewed from the bolts C, and the latter then removed to permit the broken cut to be removed and a new one substituted as will be understood. By reason of the securing bolts and nuts, and the abutting shoulders $a'$ it will be seen that the cuts will be securely held in position and cannot become accidentally displaced while in use, and the advantages attained by my invention will be obvious from the foregoing description when taken in connection with the accompanying drawings.

By removing one or more of the inside cuts and inserting washers between the nuts $c$, and the outer cuts before said nuts are screwed tight, I may obtain tools of various sizes, as will be understood.

What I claim, and desire to secure by Letters Patent, is—

In a combined bush-chisel and bush-hammer, the combination with the stock provided with the wedge-shaped shank $a$, a shoulder $a'$ formed upon each side of the said shank at the inner end thereof, said shank being provided with perforations $a^3$ extending through the same, the stock being provided with a perforation $a^3$ and a handle secured in said perforation $a^2$, of cuts B provided with perforations $b$, aligning with the perforations $a^3$, said cuts being of greater length than the shank and arranged upon each side thereof and abutting at their inner ends against the shoulders $a'$ and bolts passed through the aligned perforations $a^3$, $b$, and provided with securing nuts, all arranged as and for the purpose specified.

In testimony whereof I affix my signature in presence of two witnesses.

OCTAVE P. HOWARD.

Witnesses:
 J. P. CILLEY,
 GRACE T. CILLEY.